(12) United States Patent
Maguire et al.

(10) Patent No.: US 10,283,984 B2
(45) Date of Patent: May 7, 2019

(54) CHARGING LOCKER

(71) Applicant: Bretford Manufacturing, Inc., Franklin Park, IL (US)

(72) Inventors: Cary Maguire, Chicago, IL (US); Hubert Benjamin Ki Durn Ng, Park Ridge, IL (US); Jim Fisher, Gurnee, IL (US); Robert Gabriel, Lisle, IL (US); Caleb Durante, Oak Park, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 238 days.

(21) Appl. No.: 15/210,157

(22) Filed: Jul. 14, 2016

(65) Prior Publication Data

US 2017/0033579 A1 Feb. 2, 2017

Related U.S. Application Data

(60) Provisional application No. 62/199,365, filed on Jul. 31, 2015.

(51) Int. Cl.
*H02J 7/00* (2006.01)

(52) U.S. Cl.
CPC .......... *H02J 7/0044* (2013.01); *H02J 7/0027* (2013.01)

(58) Field of Classification Search
CPC .............................. H02J 7/0044; H02J 7/0027
USPC ................................................. 320/114, 107
See application file for complete search history.

(56) References Cited

U.S. PATENT DOCUMENTS

| | | | | |
|---|---|---|---|---|
| 4,150,284 A | * | 4/1979 | Trenkler | A61B 5/0017 398/106 |
| 4,229,829 A | * | 10/1980 | Grunwald | G09B 5/14 320/124 |
| 4,419,616 A | * | 12/1983 | Baskins | H02J 7/0042 320/110 |
| 5,244,266 A | | 9/1993 | Maldanis | |
| 5,652,499 A | * | 7/1997 | Morita | H01M 2/1066 320/112 |
| 5,701,828 A | * | 12/1997 | Benore | E05B 47/0002 109/53 |

(Continued)

FOREIGN PATENT DOCUMENTS

CN 202737489 U 2/2013
DE 102007057546 A1 6/2009

(Continued)

OTHER PUBLICATIONS

US 9,373,212 B2, 06/2016, Peters et al. (withdrawn)

(Continued)

*Primary Examiner* — Robert J Grant
*Assistant Examiner* — John T Trischler
(74) *Attorney, Agent, or Firm* — Anderson Gorecki LLP

(57) ABSTRACT

A charging locker includes a cabinet body having a plurality of integral interior shelves defining individual charging compartments, a plurality of doors individually securing each of the individual charging compartments, a plurality of modular locking and charging systems, and a modular power supply unit. Each of the plurality of modular locking and charging systems, the modular power supply unit, and the doors are individually removable from a front of the charging system without disassembly of the cabinet body to facilitate servicing of the charging locker.

15 Claims, 10 Drawing Sheets

(56) References Cited

U.S. PATENT DOCUMENTS

| | | | |
|---|---|---|---|
| 5,744,933 A * | 4/1998 | Inoue | G06Q 20/127 320/110 |
| 5,806,948 A * | 9/1998 | Rowan, Sr. | H04M 19/00 312/293.3 |
| 5,819,981 A | 10/1998 | Cox | |
| 6,157,162 A * | 12/2000 | Hayashi | B60L 11/1818 320/104 |
| 6,364,439 B1 * | 4/2002 | Cedillo | G06F 1/18 211/26 |
| 6,814,256 B2 * | 11/2004 | Clark | G07F 17/12 221/124 |
| 6,847,190 B2 * | 1/2005 | Schaefer | A61L 2/07 320/107 |
| 7,130,190 B1 * | 10/2006 | Baker | G06F 1/1632 361/695 |
| 7,507,500 B2 * | 3/2009 | Donnelly | B60L 3/0046 429/120 |
| 7,667,430 B2 * | 2/2010 | Kitanaka | B60L 3/0046 320/107 |
| 7,865,639 B2 * | 1/2011 | McCoy | H05K 5/0017 320/104 |
| 7,948,207 B2 * | 5/2011 | Scheucher | B60L 8/00 320/104 |
| 8,026,698 B2 * | 9/2011 | Scheucher | B60L 8/00 320/107 |
| 8,046,961 B1 * | 11/2011 | Cutting | F24J 2/5232 206/510 |
| 8,085,158 B2 * | 12/2011 | Sato | H01M 2/1022 320/106 |
| 8,085,159 B2 * | 12/2011 | Sato | H01M 2/1022 320/106 |
| 8,140,187 B2 * | 3/2012 | Campbell | E05B 47/0002 221/151 |
| 8,188,714 B2 * | 5/2012 | Petrick | G06F 1/182 320/107 |
| 8,509,944 B1 | 8/2013 | Kranyec | |
| 8,698,452 B2 * | 4/2014 | Scheucher | H01M 2/1077 104/34 |
| 8,710,795 B2 * | 4/2014 | Scheucher | B60L 8/00 320/104 |
| 8,718,717 B2 | 5/2014 | Vaknin et al. | |
| 8,729,865 B2 * | 5/2014 | Scheucher | B60L 8/00 320/107 |
| 8,796,987 B2 * | 8/2014 | Scheucher | B60L 8/00 320/104 |
| 8,860,377 B2 * | 10/2014 | Scheucher | H02J 1/10 320/162 |
| 8,862,388 B2 | 10/2014 | Wu et al. | |
| 8,872,474 B2 * | 10/2014 | Scheucher | B60K 1/04 320/107 |
| 8,904,198 B1 | 12/2014 | Pinto et al. | |
| 8,917,497 B2 | 12/2014 | Bergum et al. | |
| 9,030,828 B2 * | 5/2015 | Lindblad | G06F 1/1607 312/223.1 |
| 9,059,447 B2 * | 6/2015 | Scheucher | H01M 2/1077 |
| D733,923 S | 7/2015 | Ento July et al. | |
| 9,129,461 B2 | 9/2015 | Luke et al. | |
| 9,177,305 B2 * | 11/2015 | Penilla | G06Q 20/18 |
| 9,182,793 B2 * | 11/2015 | Ergun | G06F 1/1607 |
| 9,205,159 B2 | 12/2015 | Kim | |
| 9,230,390 B2 | 1/2016 | Gospodarek | |
| 9,298,225 B2 * | 3/2016 | Lindblad | G06F 1/1607 |
| 9,324,204 B2 | 4/2016 | Naghi et al. | |
| 9,330,520 B2 * | 5/2016 | Phelps | G07F 15/00 |
| 9,337,920 B2 | 5/2016 | Chen et al. | |
| 9,373,967 B1 | 6/2016 | Sullivan | |
| 9,381,822 B2 * | 7/2016 | Scheucher | B60L 8/00 |
| 9,385,549 B2 * | 7/2016 | Miller | H02J 7/0042 |
| 9,577,450 B2 * | 2/2017 | Yoshikawa | H02J 7/0044 |
| 9,680,188 B2 * | 6/2017 | O'Hora | H01M 10/425 |
| 9,680,317 B2 * | 6/2017 | Roberts | H02J 7/0027 |
| 9,711,868 B2 * | 7/2017 | Scheucher | H01Q 19/30 |
| 9,724,819 B2 * | 8/2017 | Barry | B25H 3/006 |
| 9,793,750 B2 * | 10/2017 | Miller | H02J 7/1423 |
| 9,887,562 B2 * | 2/2018 | Racenet | H02J 7/0042 |
| 10,054,982 B2 * | 8/2018 | Petrick | H01R 13/465 |
| 2002/0074341 A1 * | 6/2002 | Clark | G07F 11/62 221/92 |
| 2003/0111245 A1 | 6/2003 | Haggerty | |
| 2003/0160590 A1 * | 8/2003 | Schaefer | A61L 2/07 320/107 |
| 2005/0104555 A1 | 5/2005 | Simmonds-short | |
| 2005/0269995 A1 * | 12/2005 | Donnelly | B60L 3/0046 320/150 |
| 2006/0012334 A1 * | 1/2006 | Watson | B60L 3/0046 320/112 |
| 2007/0058344 A1 * | 3/2007 | Baker | G06F 1/1632 361/695 |
| 2007/0188130 A1 * | 8/2007 | Scheucher | B60L 8/00 320/110 |
| 2007/0188137 A1 * | 8/2007 | Scheucher | H02J 1/10 320/116 |
| 2007/0193318 A1 * | 8/2007 | Churchill | E05B 11/00 70/389 |
| 2008/0053716 A1 * | 3/2008 | Scheucher | B60L 8/00 180/2.1 |
| 2008/0213652 A1 * | 9/2008 | Scheucher | B60L 8/00 429/62 |
| 2009/0033456 A1 | 2/2009 | Castillo et al. | |
| 2009/0040058 A1 * | 2/2009 | Sato | H01M 2/1022 340/636.1 |
| 2009/0256525 A1 * | 10/2009 | Kitanaka | B60L 3/0046 320/134 |
| 2009/0298553 A1 | 12/2009 | Ungari et al. | |
| 2010/0106291 A1 * | 4/2010 | Campbell | E05B 47/0002 700/231 |
| 2010/0176762 A1 * | 7/2010 | Daymude | H02J 7/0027 320/115 |
| 2010/0250043 A1 * | 9/2010 | Scheucher | B60L 8/00 701/22 |
| 2011/0036747 A1 * | 2/2011 | Petrick | G06F 1/1628 206/701 |
| 2011/0085069 A1 * | 4/2011 | Sato | H01M 2/1022 348/333.02 |
| 2011/0193524 A1 | 8/2011 | Hazzard et al. | |
| 2011/0221384 A1 * | 9/2011 | Scheucher | B60L 8/00 320/101 |
| 2012/0074902 A1 * | 3/2012 | Scheucher | H01M 2/1077 320/109 |
| 2012/0078413 A1 | 3/2012 | Baker, Jr. | |
| 2012/0080941 A1 * | 4/2012 | Scheucher | B60L 8/00 307/18 |
| 2012/0092018 A1 * | 4/2012 | Scheucher | B60L 8/00 324/426 |
| 2012/0223676 A1 * | 9/2012 | Petrick | G06F 1/1628 320/115 |
| 2012/0330462 A1 | 12/2012 | Maroney et al. | |
| 2013/0001435 A1 * | 1/2013 | Engelhardt | A61L 2/20 250/455.11 |
| 2013/0027183 A1 | 1/2013 | Wu et al. | |
| 2013/0110653 A1 | 5/2013 | Rivers, Jr. et al. | |
| 2013/0132307 A1 * | 5/2013 | Phelps | H02J 7/0027 705/412 |
| 2013/0154566 A1 * | 6/2013 | Emslie | H02J 7/0044 320/115 |
| 2013/0277930 A1 * | 10/2013 | Ergun | G06F 1/1607 280/47.35 |
| 2013/0279109 A1 * | 10/2013 | Lindblad | G06F 1/1607 361/679.43 |
| 2013/0290592 A1 * | 10/2013 | Petrick | G06F 1/1626 710/303 |
| 2013/0335027 A1 * | 12/2013 | Xin | G07F 17/20 320/114 |
| 2014/0121829 A1 * | 5/2014 | Gospodarek | H02J 7/0027 700/236 |
| 2014/0135042 A1 | 5/2014 | Buchheim et al. | |
| 2014/0152238 A1 * | 6/2014 | Racenet | H02J 7/0042 320/107 |

(56) References Cited

U.S. PATENT DOCUMENTS

| | | | |
|---|---|---|---|
| 2014/0159640 A1* | 6/2014 | Yoshikawa | H02J 7/0044 320/103 |
| 2014/0175031 A1* | 6/2014 | Roberts | H02J 7/0027 211/26.2 |
| 2014/0214500 A1 | 7/2014 | Hudson et al. | |
| 2014/0225566 A1* | 8/2014 | Scheucher | H01M 2/1077 320/109 |
| 2014/0232320 A1 | 8/2014 | Ento July et al. | |
| 2014/0239883 A1* | 8/2014 | Hobson | H02J 7/0027 320/107 |
| 2014/0312845 A1* | 10/2014 | Scheucher | B60L 8/00 320/125 |
| 2014/0330407 A1* | 11/2014 | Corder | G06Q 10/0631 700/90 |
| 2014/0330603 A1* | 11/2014 | Corder | G06Q 10/0631 705/7.12 |
| 2014/0354214 A1* | 12/2014 | Phelps | G07F 15/00 320/107 |
| 2015/0028797 A1* | 1/2015 | Miller | H02J 7/0042 320/103 |
| 2015/0077221 A1 | 3/2015 | Peters et al. | |
| 2015/0084590 A1 | 3/2015 | Pearlman | |
| 2015/0192968 A1* | 7/2015 | Lindblad | G06F 1/1607 361/679.41 |
| 2015/0220897 A1 | 8/2015 | Weatherdon et al. | |
| 2015/0249353 A1* | 9/2015 | Hamilton, IV | H02J 7/0045 320/114 |
| 2015/0280472 A1* | 10/2015 | Hohl | H02J 7/0045 320/111 |
| 2015/0318521 A1* | 11/2015 | Zeiler | H01M 10/0525 320/107 |
| 2015/0363749 A1 | 12/2015 | Buscher et al. | |
| 2015/0380975 A1* | 12/2015 | Kanahara | H02J 7/025 320/108 |
| 2016/0020625 A1 | 1/2016 | Tsou | |
| 2016/0068075 A1 | 3/2016 | Chen et al. | |
| 2016/0111902 A1* | 4/2016 | Ergun | G06F 1/1607 320/114 |
| 2016/0156207 A1 | 6/2016 | Frankenberger | |
| 2016/0205800 A1* | 7/2016 | Roberts | H05K 7/14 361/809 |
| 2016/0240032 A1* | 8/2016 | Agor | G07F 17/12 |
| 2016/0251115 A1* | 9/2016 | Barry | B25H 3/006 220/23.4 |
| 2016/0276852 A1* | 9/2016 | Roberts | H02J 7/0027 |
| 2016/0322858 A1* | 11/2016 | Miller | H02J 7/0042 |
| 2017/0027079 A1* | 1/2017 | Dombrowski | H02J 5/00 |
| 2017/0033337 A1* | 2/2017 | O'Hora | H01M 10/425 |
| 2017/0077724 A1* | 3/2017 | Clark | H02J 7/0045 |
| 2017/0256965 A1* | 9/2017 | Clark | H02J 7/0027 |
| 2017/0348848 A1* | 12/2017 | Barry | B25H 3/006 |

FOREIGN PATENT DOCUMENTS

| | | |
|---|---|---|
| DE | 102011009898 A1 | 1/2011 |
| DE | 202013008511 U1 | 2/2014 |
| EP | 2101390 A2 | 9/2009 |
| EP | 2905169 A2 | 8/2015 |
| ES | 1064918 U | 5/2007 |
| GB | 2428525 A | 1/2007 |
| GB | 2440007 A | 1/2008 |
| GB | 2487976 A | 8/2012 |
| GB | 2490716 A | 11/2012 |
| JP | H 09245841 A | 9/1997 |
| JP | 2005190450 A | 7/2005 |
| JP | 2014011862 A | 1/2014 |
| WO | WO 85/01812 | 4/1985 |
| WO | WO 2005/076233 A1 | 8/2005 |
| WO | WO 2011/017757 A1 | 2/2011 |
| WO | WO 2013/156956 A1 | 10/2013 |
| WO | WO 2015/090074 A1 | 6/2018 |

OTHER PUBLICATIONS

TekStak product literature (2 pages).
Lock-n-charge Fuyl Cell product literature (2 pages).
American Locker product literature (5 pages).
Precision Locker product literature (5 pages).
Orion Charging Station product literature (3 pages).
Smartecarte product literature (2 pages).

* cited by examiner

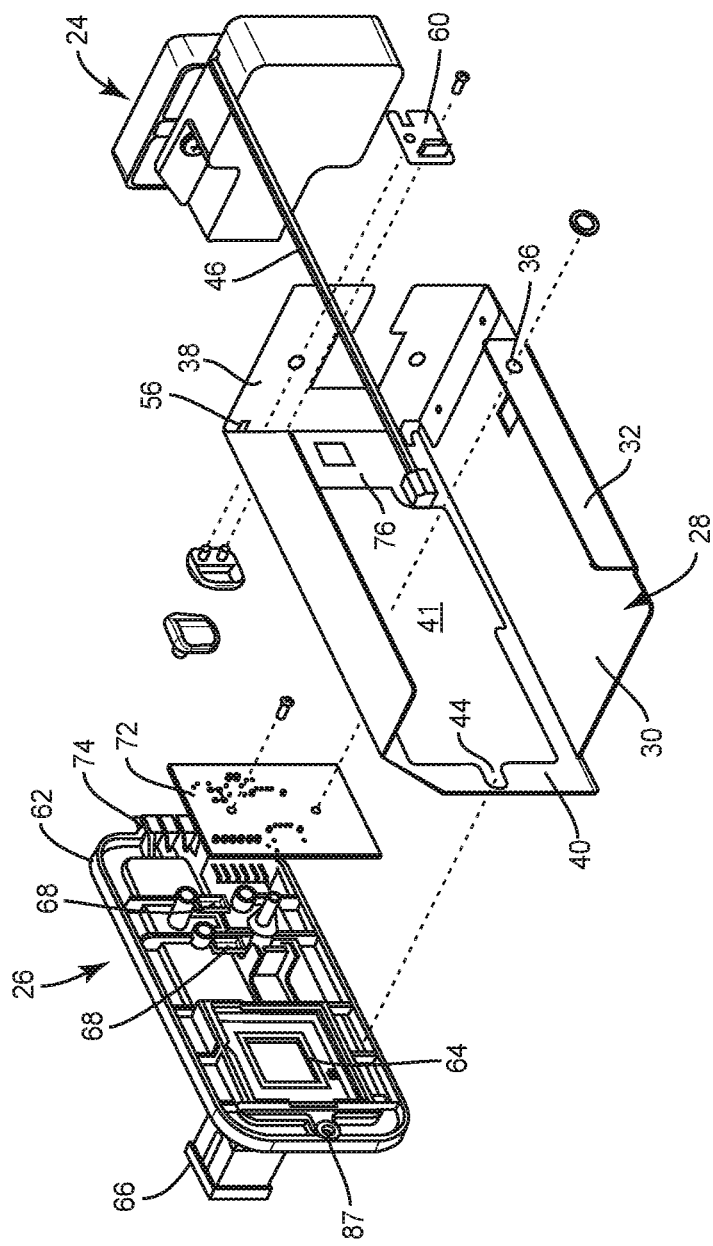

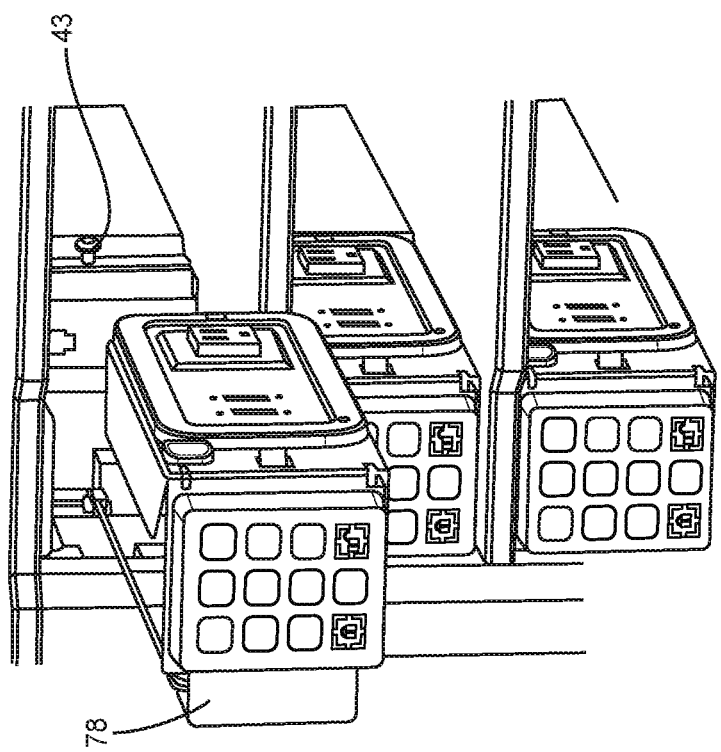

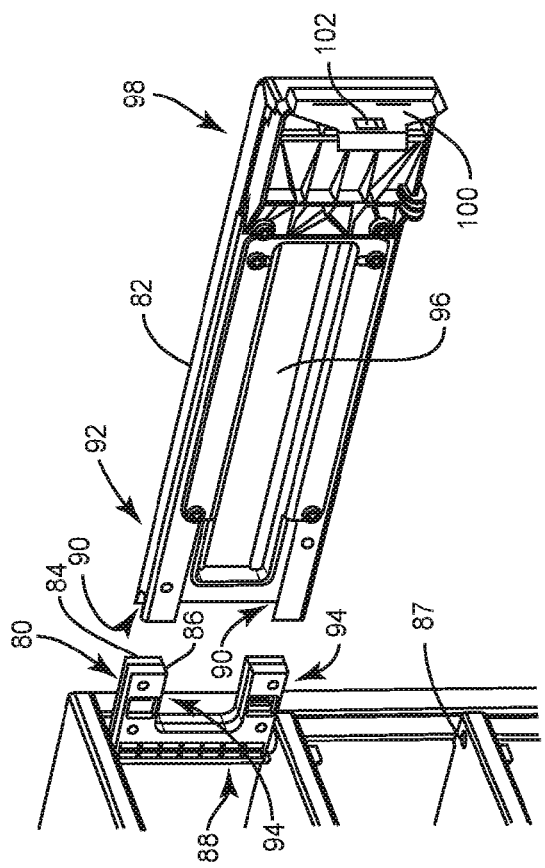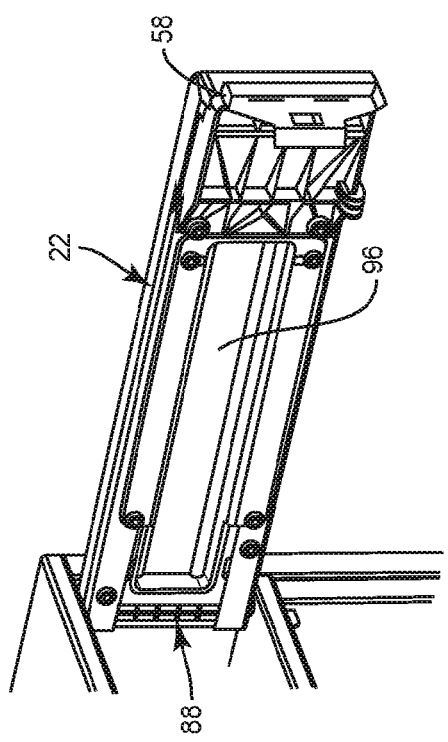

CHARGING LOCKER

CROSS-REFERENCE TO RELATED APPLICATIONS

This application claims priority to Provisional Application 62/199,365 filed Jul. 31, 2015, the content of which is hereby incorporated herein by reference.

BACKGROUND

This disclosure relates to a charging locker designed to provide secure individual charging stations.

SUMMARY

All examples and features mentioned below can be combined in any technically possible way.

In one aspect, a charging locker, includes a cabinet body having a plurality of integral interior shelves defining a plurality of individual charging compartments, a plurality of doors corresponding to the plurality of individual charging compartments to individually enclose each of the individual charging compartments, and a plurality of modular locking and charging systems corresponding to the plurality of individual charging compartments to individually secure each of the plurality of doors. Each of the plurality of modular locking and charging systems, and doors are individually removable from a front of the charging system without disassembly of the cabinet body.

In some implementations, the modular locking and charging system comprises a frame forming a front plate and a side plate, wherein the keypad locking system is connected to the front plate of the frame, and wherein the charging system is connected to the side plate of the frame.

In certain implementations, the frame further includes a bottom plate extending from the side plate of the frame and a rear fold formed on an edge of the bottom plate distal from the side plate of the frame.

In some implementations, the charging locker further includes a first aperture in the rear fold to receive a first connector to removably secure the frame to an interior of one of the individual charging compartments.

In certain implementations, the first connector is accessible by insertion of a tool through a second aperture in the side plate of the frame.

In some implementations, the charging system is supported by the side plate of the frame and is selectively secured to the interior of one of the individual charging compartments by a second connector to be removable from the interior of the individual charging compartment without removing the frame.

In certain implementations, the charging system has a lip to extend through an aperture in the side plate of the frame to engage a rear surface of the side plate of the frame to hold the charging system against the front surface of the side plate of the frame.

In some implementations, the charging system includes a National Electrical Manufacturers Association (NEMA) electrical outlet or an International Electrotechnical Commission (IEC) coupler and two USB outlets.

In certain implementations, the NEMA electrical outlet or IEC coupler provides 110-120V AC power or 220-240V AC power and the two USB outlets each provide DC power according to one of the USB standards.

In some implementations, the charging locker further includes a door sensor configured to detect when the door is closed.

In certain implementations, the door sensor is an optical sensor.

In some implementations, the frame comprises a slit, wherein the door comprises a projection to fit through the slit when the door is closed, and wherein the projection interferes with light associated with the optical sensor when the door is closed.

In certain implementations, the door includes a hinge, a door extension removably coupled to the hinge, a latch plate at the end of the door extension, and a window formed within the door extension.

In some implementations, the charging locker further includes a single modular power system to provide power to each of the individual charging compartments of the charging locker.

In another aspect, a storage system includes a plurality of individual charging compartment modules, each individual charging compartment module having an exterior body envelope defining a secure interior space of the individual charging compartment module and a door to individually enclose the secure interior space. The storage system also includes at least one modular locking and charging system, the at least one modular locking and charging system being associated with at least one of the individual charging compartment modules and being configured to individually secure the door of the at least one individual charging compartment module. The modular locking and charging system, and the door of the at least one of the individual charging compartment modules are individually removable from a front of the storage system without disassembly of the storage system and without removal of the at least one of the individual charging compartment modules from the storage system.

In some implementations, the storage system further includes a plurality of modular locking and charging systems, the plurality of modular locking and charging systems corresponding on a one to one basis with the plurality of individual charging compartment modules.

BRIEF DESCRIPTION OF THE DRAWINGS

FIG. 5 is a rear exploded perspective view of the modular locking and charging system of FIG. 3.

FIGS. 7-9 are perspective views of the locker of FIGS. 1-2, the sequence of which shows a process of inserting or removing the modular locking and charging system of FIGS. 3-6 from the charging locker of FIGS. 1-2, for example in connection with servicing or replacement of the modular locking and charging system.

FIGS. 10-11 are perspective views of an example door of the charging locker of FIGS. 1-2, the sequence of which shows a process of removing the door from the charging locker of FIGS. 1-2, for example in connection with servicing or replacement of the door.

DETAILED DESCRIPTION

This disclosure is based, at least in part, on the realization that it is desirable to provide a charging locker having easily removable components to facilitate maintenance and repair of individual compartments of the charging locker without disassembly of the cabinet body of the charging locker, or without removal/separation/disassembly of a unit from a larger installed group of lockers.

Figure 2:
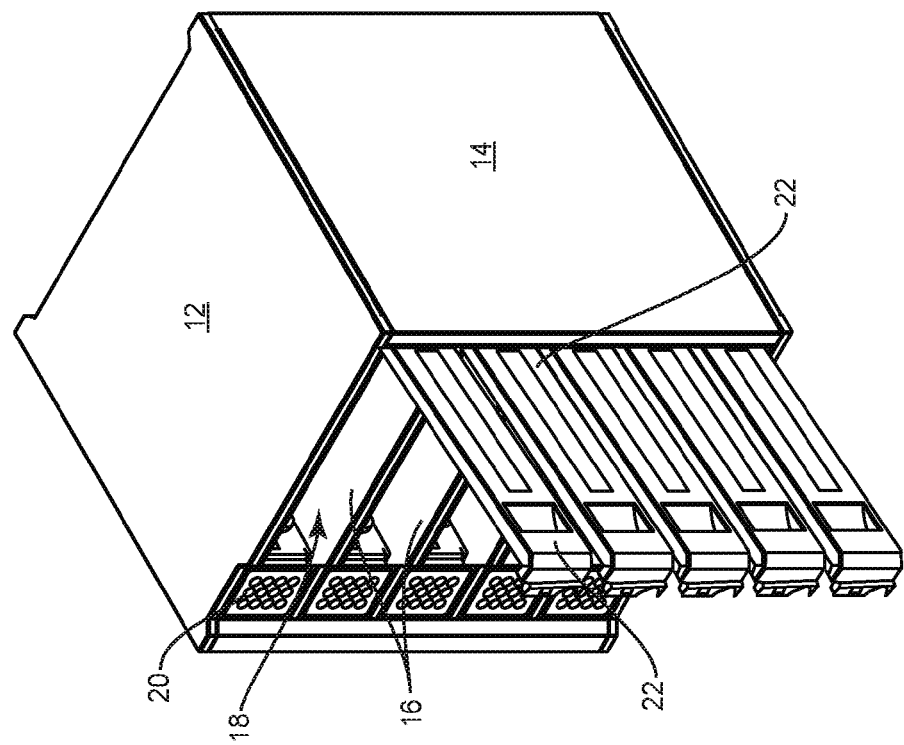
FIGS. 1-2 are perspective views of an example charging locker according to an embodiment.
Figure 1:
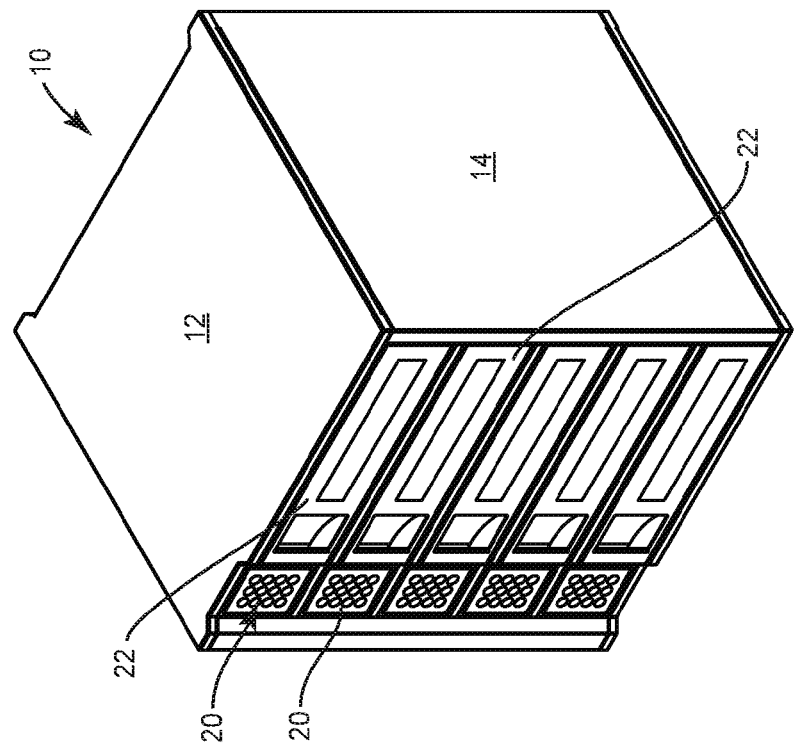
Figure 12:
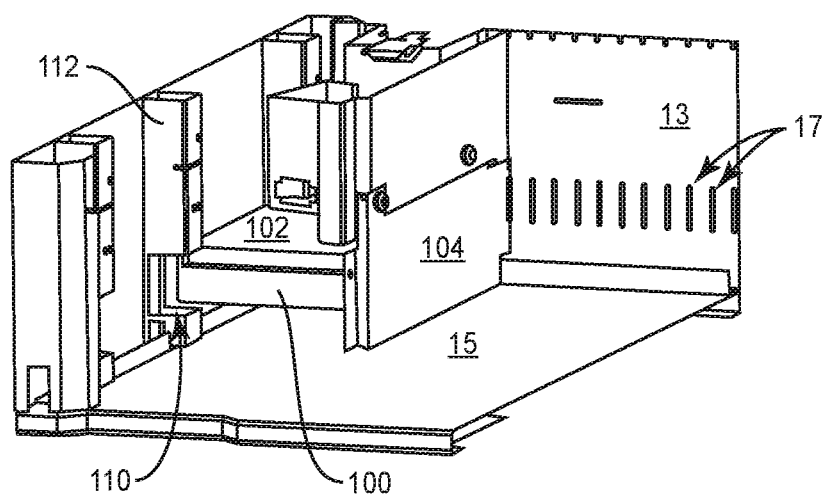
FIGS. 12-14 are perspective views of a portion of an interior of the charging locker of FIGS. 1-2, the sequence of which shows a process of removing or inserting a modular power supply unit from the charging locker of FIGS. 1-2, for example in connection with servicing or replacement of the modular power supply unit or servicing or replacement of a power supply unit into a single stand-alone charging locker.
Figure 13:
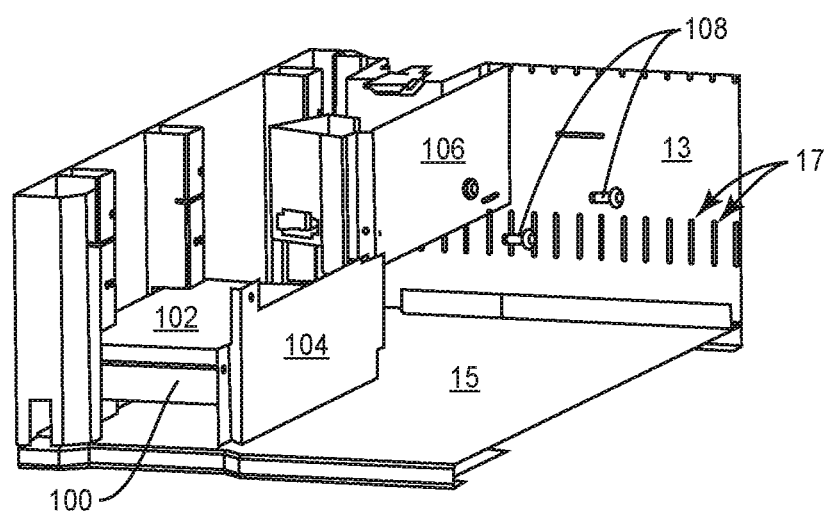
Figure 14:
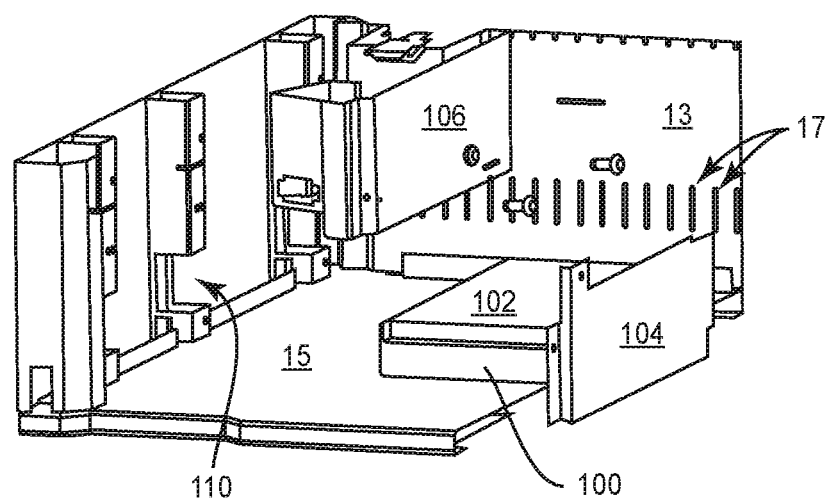

FIGS. 1-2 are perspective views of an example charging locker 10. The charging locker 10 includes cabinet body formed from a top panel 12, side panels 14, back panel 13 and bottom panel 15. The back and bottom panels are not visible in the perspective view shown in FIGS. 1-2 but may be seen in FIGS. 12-14. Because the charging locker is designed to provide power to handheld electronic devices while the devices are stored within the charging locker, suitable ventilation is preferably provided on the side panels, top panel, bottom panel, back panel, or elsewhere on the cabinet body of the charging locker to enable heat generated by the handheld electronic devices to be dissipated from the charging locker. For example, as shown in FIGS. 12-14, in an implementation the back panel 13 has slits 17 formed therein to enable air to circulate into and out of the charging locker 10. Additionally, a gap may be formed around the door to provide cross-ventilation within the unit and to allow heat to escape out both the front and back of the unit.

Interior shelves 16 are provided within the cabinet body to compartmentalize the charging locker and define individual charging compartments 18. Interior shelves may be secured to the cabinet body using any method which prevents access from one individual charging compartment 18 into an adjacent individual charging compartment 18. For example, where the cabinet body is formed from metal, the interior shelves 16 may be attached to the side and rear surfaces using screws or other mechanical fasteners. Optionally the interior shelves may be welded to the side surfaces 14 and potentially also to the rear surface 13.

In another implementation, each individual charging compartment is formed as a separate module with an access door. The individual charging compartment modules, in this implementation, may be connected to each other in any desired configuration such that any number of individual modules may be connected together to form a storage system. In this implementation the individual modules may be secured to one another via mechanical fasteners such as bolts or screws, and may have cooperating external features such as tabs and slots that enable the individual modules to be secured to one another using a minimum number of mechanical fasteners. Optionally the individual modules may also be more permanently secured to one another such as by using adhesive during installation or by welding the individual modules together.

Optionally one or more ventilation holes may be formed in the shelves to enable heat to rise through the charging locker between charging compartments to enable air to be exchanged between the individual charging compartments 18, for example to enable heat from lower individual charging compartments 18 to convect upward through upper individual charging compartments 18 to be being dissipated from the charging locker. Optionally a channel may be formed at a rear of the charging locker to form a chimney for heat to be convected out of the charging locker.

While the charging locker 10 shown in FIGS. 1-2 shows the individual charging compartments 18 horizontally oriented and stacked on top of each other, in another embodiment the individual charging compartments 18 may be vertically oriented and stacked next to each other. Further, in the implementation shown in FIGS. 1-2 the charging locker 10 includes five individual charging compartments 18. Other implementations may include other numbers of individual charging compartments 18, such as a number of individual charging compartments 18 between 2 and 20. The exact number of individual charging compartments 18 will depend on the implementation and the intended use of the charging locker 10.

Multiple charging lockers 10 may be stacked on top of each other, or placed alongside each other. Where multiple charging lockers are provided, the multiple charging lockers may be joined together, both in a horizontal and vertical directions, to enable a larger bank of charging lockers to be formed from plural modular units. When multiple charging lockers 10 are stacked on top of each other, the doors of each of the charging lockers 10 may face the same direction or may face in different directions. Likewise although the implementation shown in FIGS. 1-2 shows all of the individual compartments facing the same direction in the charging locker 10, in another implementation the individual charging compartments may face two, three, or four directions within the charging locker 10. For example, in a charging locker having four individual charging compartments 18, one individual charging compartment may face the front, a second individual charging compartment may face the left, a third individual charging compartment may face the right, and a fourth individual charging compartment may face the rear. Multiple arrangements of the orientations of the charging lockers are possible depending on the implementation.

Charging lockers may be usefully deployed in environments where individuals may have a need to securely store portable handheld devices, tablet computers, and laptop computers, while the devices receive charging power. Example venues may include schools, airports, malls, restaurants, bars, theatres, amusement parks, and arenas, although virtually any public place may provide a suitable candidate location for a charging locker.

In one implementation, each charging locker is configured to provide 110-120 V AC power outlet or a 220-240V AC power outlet, as well as two 2.1 A, 5V DC (USB) power outlets. Laptop computers often require access to 110-120V or 220-240V AC power for charging. Handheld electronic devices and tablet computers frequently require 5V DC power for charging, e.g. according to one of the USB standards. In one implementation, the charging system 26 discussed in greater detail below provides both types of power. Optionally, in another implementation, the charging system 26 also includes an additional outlet to provide 20V DC power, for example to enable a laptop computer to be charged without requiring a laptop transformer (brick).

In one implementation, each charging locker includes at least one National Electrical Manufacturers Association (NEMA) electrical outlet or an International Electrotechnical Commission (IEC) coupler and two USB outlets. The NEMA electrical outlet or IEC coupler provides 110-120V AC power or 220-240V AC power and the two USB outlets each provide DC power according to one of the USB standards.

Access to each individual charging compartment 18 is controlled by a modular locking and charging system 20 and a corresponding door 22. In one implementation, the cabinet body 10, interior shelves 16, and doors 22, are preferably strongly made and capable of rough handling, and provide a secure envelope within which handheld electronic devices such as portable computers, tablet computers, phones, smartphones, personal data assistants, GPS units, or other types of powered consumer devices may be stored. The cabinet body or individual charging locker modules are designed to be sufficiently robust that it is not necessary to repair or replace the top panel 12, back panel 13, side panels 14, bottom panel 15, or other components of the cabinet body or individual charging locker modules absent significant abuse.

The access mechanisms, such as the door 22 and the modular power and charging system 20, however, are relatively high use items involving moving parts and electronic control circuits. As such, even though these components are strongly made and capable of rough handling, it is likely that over time these components may need to be serviced.

According to an implementation, each individual charging compartment 18 is provided with a modular locking and charging system 20, which controls a respective door 22 of the individual charging compartment. As discussed in greater detail below, the modular locking and charging system 20 as well as the door 22 are designed to be removable by a technician from the interior of the respective individual charging compartment without accessing an adjacent individual charging compartment 18 and without dismantling the cabinet body of the charging locker and without modifying the locker installation configuration such that the locker to be serviced does not need to be removed from the installed bank of lockers. By providing the charging locker with individually removable and serviceable components within each individual charging compartment, it is possible for a technician to fix an individual compartment while the other individual charging compartments remain locked and in use, and without requiring any modification to the envelope of the charging locker.

Although access to the individual modules may be individually secured using individual keypads as discussed in greater detail herein, alternatively, a single keypad may control access to multiple individual storage compartments. In this implementation a single keypad is interconnected to multiple plunging mechanisms to enable the single keypad to individually be used to selectively provide access to multiple individual storage compartments.

Figure 4:
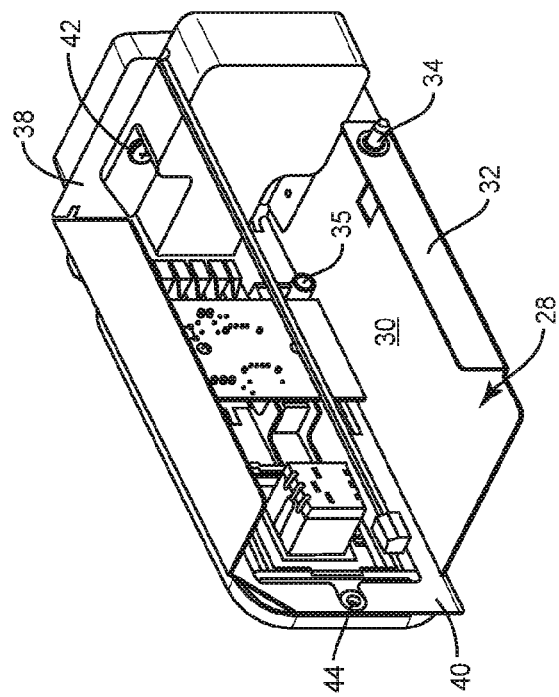
FIG. 4 is a rear perspective view of the modular locking and charging system of FIG. 3.
Figure 3:
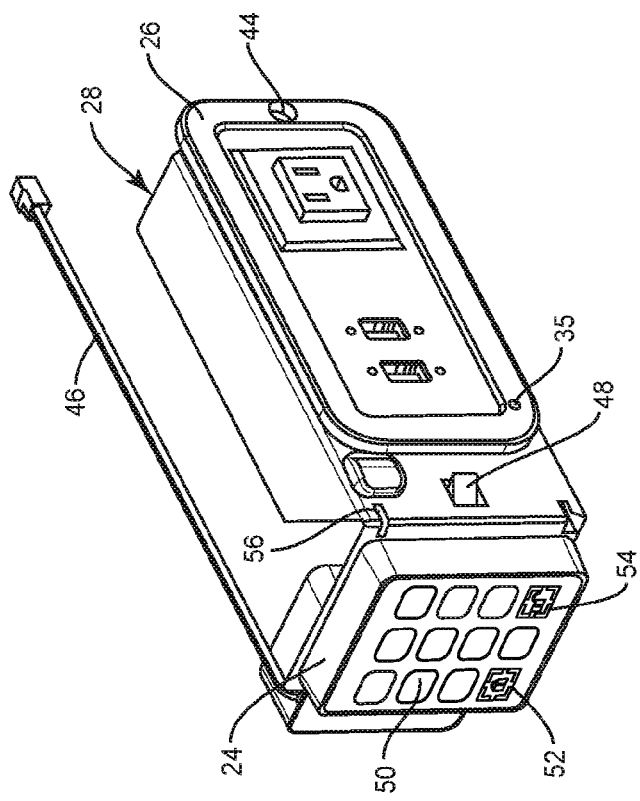
FIG. 3 is a front perspective view of a modular locking and charging system for use with the charging locker of FIGS. 1-2.

FIGS. 3-6 are perspective views of a modular locking and charging system 20 for use with the charging locker of FIGS. 1-2. As shown in FIG. 3, the modular locking and charging system 20 includes a keypad locking system 24 and a charging system 26. The keypad locking system 24 and charging system 26 are supported by a frame 28. The frame 28 is formed, for example, of bent sheet metal configured to provide rigidity to the modular locking and charging system 20 so that the modular locking and charging system 20 may be inserted into one of the individual charging compartments as a unit. For example, as best seen in FIG. 4, the frame 28 in one implementation includes a bottom 30, and a rear fold 32. A connector 34, such as a machine screw or bolt, extends through an aperture 36 in the rear fold 32 and is used to secure the rear fold 32 of the frame 28 to the interior of the individual charging compartment. Access to the connector 34 is by way of aperture 35 in the face of charging system 26. Although a single connector 34 is shown, other numbers of connectors may be used as well. For example additional connectors 34 passing through additional apertures (not shown) spaced along the rear fold could be used to secure the rear fold 32 of the frame 28 to the interior of the individual charging compartment 18 at multiple locations.

The frame 28 further includes a front plate 38 on which the keypad locking system 24 is mounted, and a side plate 40 on which the charging system 26 is mounted. For example, in the implementation shown in FIG. 4 the keypad locking system 24 is mounted to the front plate 38 via screws 42. Similarly a face plate 62 of the charging system 26 is mounted to the side plate 40. In an implementation, as shown in FIG. 5, a lip 74 engages edge 76 of the front plate of the frame. A screw 43 (See FIG. 9) passes through aperture 78 in face plate 62 and notch 44 in the front plate of the frame 38 to secure the frame to the interior of the individual charging compartment 18. Since both the face plate of the charging system and the keypad locking system 24 are easily removable from the charging locker, it is possible to easily service these components simply by unscrewing connector 34 via aperture 35 and by unscrewing connector 43 via aperture 44. In another implementation, one or more of the face plate and side plate may snap into place within the interior of the locker to enable the frame 28 to be at least partially secured in place within the locker due to the snap fit of the components.

In one implementation, connectors 34 and 43 are formed as screws which have driving faces that are formed to be tamper resistant, such as by using a multi-lobed drive pattern such as a pinned six lobe drive pattern, un-pinned six lobe drive pattern, or other tamper resistant drive pattern. By using a tamper resistant drive pattern on the faces of connector 34 and 43, a special tool is required to engage connectors 34 and 43 to cause these connectors to rotate to be disengaged from the interior of the individual charging compartment 18. This prevents unauthorized individuals from using common tools, such as a Phillips head screw driver, from removing the modular locking and charging system 20.

In one implementation, the charging system is supported by the frame and selectively secured to the interior of one of the individual charging compartments by screw 43 to be removable from the interior of the individual charging compartment without removing the frame. In this implementation, the surface area of face plate 62 is larger than an aperture 41 formed in side plate 40 of frame 28. Lip 74 of face plate 62 extends through aperture 41 to engage a rear surface of the side plate 40 of frame 28 and the rear surface of face plate 62 engages the front surface of the side plate 40 of frame 28. Screw 43 engages the interior of the compartment to pull the face plate 62 securely against the front surface of the side plate 40. In this manner the charging system may be selectively removed from the individual charging compartment 18 without removing the frame 28.

The keypad locking system 24 in an implementation is an electronic lock that receives line power and USB power from modular power supply unit 100 (see FIGS. 12-14) via power cord 46. Power cord 46 plugs into a power distribution system within the charging locker. External power is provided to the charging locker from a plug (not shown) that connects to a wall outlet or is directly wired into an external power system such as by being directly connected to an electrical circuit provided within a building.

Optionally a temporary source of power such as a battery may be included to provide power within the storage system when an external source of power is temporarily unavailable. The temporary source of power enables the electronic locks to function during the temporary power outage. In one implementation a single temporary source of power may provide power to multiple individual charging compartments such that each charging compartment is not required to include a battery backup to enable access to the individual charging compartment during a temporary power interruption.

In one implementation, keypad locking system 24 is reprogrammable every use, such that a new code is input by an individual to cause the keypad locking system to engage plunger 48. In operation, a user determines which individual charging compartment is available by looking for a door that is openable. The user then inserts any property such as one or more handheld electronic devices into the individual charging compartment and closes the door. The individual enters a four digit code of their choosing to cause keypad locking system 24 to extend plunger 48. Extending plunger 48 causes plunger 48 to engage latch hole 102 of latch plate 100 on the respective door 22 of that individual charging compartment (See FIG. 10) to secure the user's property within the individual charging compartment. Optionally a time delay such as a three second time delay may be inserted between entry of the code and extension of the plunger. In this implementation, the user is able to open and shut the door for up to three seconds before activation of the plunger to allow the user to place additional items in the locker. If the door is open for more than three seconds, the lock will reset and the user will need to re-enter the code to activate the lock to cause the plunger to extend. This has the further advantage that if the user believes that an incorrect access code was inadvertently entered into the keypad, the user can open the door of the locker for a period exceeding three seconds to cause the lock to be reset so that the correct code may be entered.

Once the plunger has been extended, the individual charging compartment is secured. At a later point in time, when the four digit selected code is presented to the keypad locking system 24, the keypad locking system 24 will retract the plunger 48 to unlock the respective door 22.

In an implementation, the keypad locking system 24 has a digital keypad interface as described in provisional application 62/219,825 filed Sep. 17, 2015, entitled Electronic Lock Digital Keypad Interface, the content of which is hereby incorporated herein by reference.

In one implementation a horizontal slit 56 is formed in the front plate 38 of the frame 28. The slit 56 enables a corresponding projection 58 of door 22 (see FIG. 10) to pass through a portion of the frame 28 to engage a door sensor to allow the keypad locking system 24 to know when the door is fully closed. In one implementation, the door sensor is an optical sensor formed, for example, by electrical components implemented on circuit 60 behind the front plate 38 of the frame. In an implementation, when the projection 58 passes through slit 56, projection 58 will intercept the continuity of light being transmitted and received by electrical components on the circuit 60 to indicate that the door is closed. In one implementation the light is a vertically oriented infra-red beam generated by an LED and received by a photo-diode. Other implementations are possible. Selectively interrupting the light enables the modular locking and charging system 20 to know when door 22 is closed. This enables state activated features to be implemented in connection with individual charging compartments. For example, a light within the compartment may be turned on when the door is open and turned off when the door is closed. Likewise, keypad locking system 24 may delay extending plunger 48 until circuit 60 indicates that door 22 has been closed. By detecting the state of the door, these and other state activated features may be implemented within individual charging compartments of the charging locker.

Figure 6:
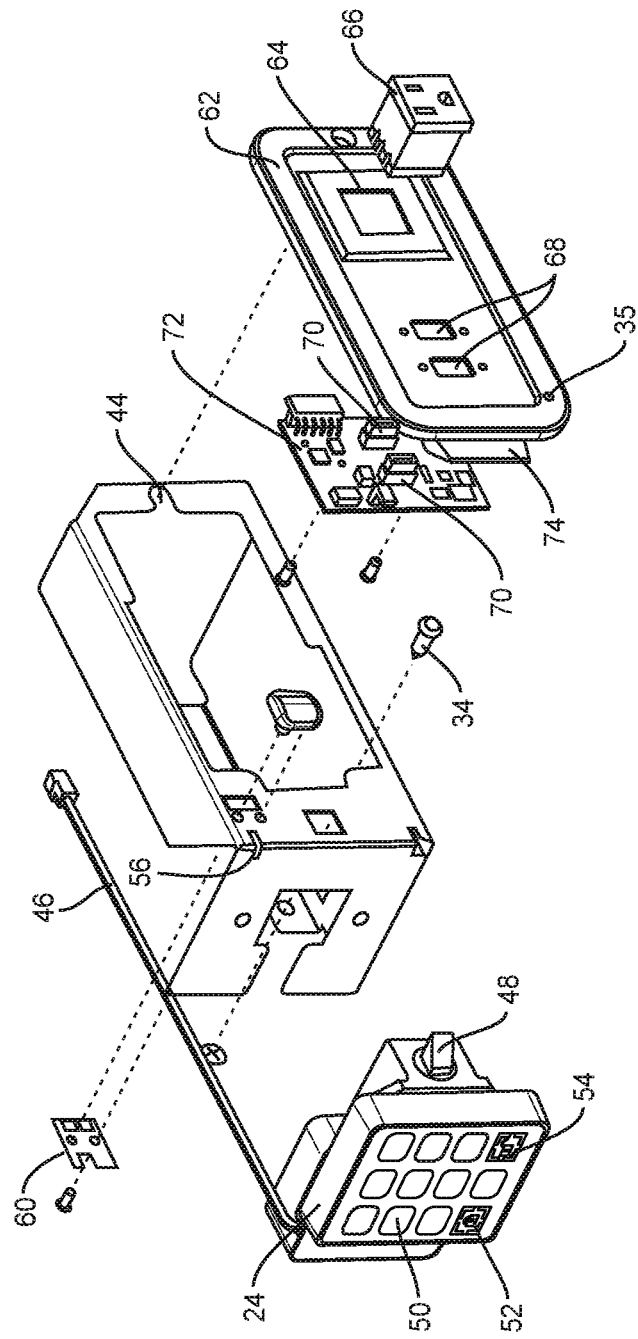
FIG. 6 is a front exploded perspective view of the modular locking and charging system of FIG. 3.

FIGS. 5-6 show exploded perspective views of the charging system 26 in greater detail. As shown in FIG. 6, the charging system includes a face plate 62 having an AC aperture 64 to receive an AC outlet such as simplex 66. In one implementation, the simplex 66 is an outlet configured according to one of the standards promulgated by the National Electrical Manufacturers Association (NEMA). In another implementation, the simplex 66 is a coupler configured according to one of the standards promulgated by the International Electrotechnical Commission (IEC). Other AC receptacles or couplers may be used as well. The face plate 62 further includes two DC apertures 68 through which DC receptacles 70 may be accessed. Example DC receptacles may include, for example, one or more USB outlets. Other types of DC receptacles may be provided as well. DC receptacles are formed on circuit board 72. In one implementation, each USB outlet is separately powered providing 2.1 A per outlet. Since USB circuitry is commonplace, further discussion of the details of that electronic componentry will not be provided.

Figure 7:
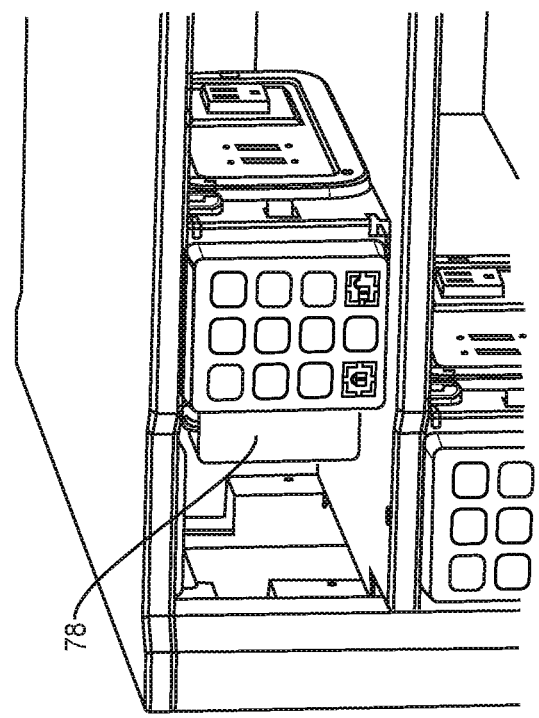
Figure 8:
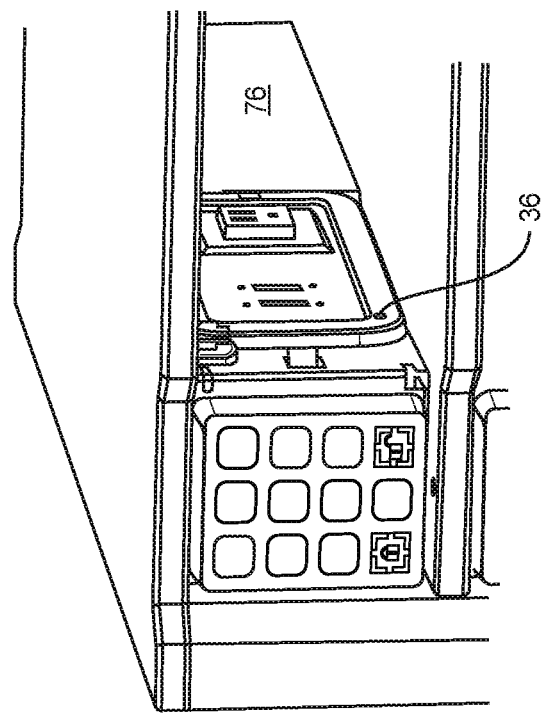

FIGS. 7-9 show a process of removing a modular locking and charging system from an individual charging compartment 18. As shown in FIG. 7, when the modular locking and charging system is installed in the individual charging compartment, it is secured in place by a connector 34 such as a machine screw that attaches the rear fold 32 of frame 28 to the interior of the compartment. Optionally a second connector 43 secures a rear area of the modular locking and charging system to the interior of the individual charging compartment 18 toward the rear of the individual charging compartment 18.

To remove the modular locking and charging system from the interior of the individual charging compartment 18, a technician accesses the connector 34 via aperture 36 to cause the connector to disengage the interior of the compartment. The technician will also disengage connector 43 from the interior of the compartment. The front plate 38 of the frame 28 is adjacent vertical wall 76 within compartment 18 to prevent access to the rear of the keypad locking system 24 or the rear of the charging system 26 while the modular locking and charging system is secured within the individual compartment 18.

Once the connectors 34, 43 have been disengaged, the modular locking and charging system 20 may be slid to the right, as shown in FIG. 8, and then slid forward and out of the individual charging compartment 18 as shown in FIG. 9. It should be noted that keypad locking system 24 includes lip 78 which engages a frame of the charging locker to prevent forced access into the interior of the individual compartment from the front of the charging locker.

Although the sequence of figures (FIGS. 7, 8, and 9) show the process of removing a modular locking and charging system, the reverse process may be used to reinstall a modular locking and charging system into an individual compartment. Accordingly, it is possible to service individual compartments to repair or replace a keypad locking system on one of the individual compartments, or to repair or replace a charging system on one of the individual compartments, without affecting any of the other compartments and without disassembling the structure (walls, interior shelves, etc.) of the charging locker and without removing the charging locker from a bank of installed similar charging lockers to enable this repair to take place.

FIGS. 10-11 show an example door that may be used in connection with an implementation. As shown in FIG. 10, the door 22 includes a hinge 80 and an extension 82. Hinge 80, in an implementation, is formed from two pieces of material 84, 86 that are sandwiched together and joined using screws or other mechanical fasteners, such as integral snap fit locking mechanisms. The two pieces of material in an implementation are each implemented as a C-shaped bracket having a pair of legs 94 and a vertical cross-bar 88. The vertical cross-bar includes a vertical channel designed to snap around and become secured to a vertical rod that spans between the ceiling and floor of an individual charging compartment 18. The vertical rod thus serves as the pivot for the hinge 80 and, hence, for door 22. Aperture 87 for receiving a rod is shown in FIG. 11. The rod is secured into the aperture 87 and a similar aperture on an upper surface, and the front and back pieces 84, 86 engage the rod along vertical cross-bar 88 to enable the hinge 80 to pivot about the vertical rod. In one implementation a single vertical rod may be used for more than one compartment. For example, a single vertical rod may be formed to span all of the individual compartments of the charging locker.

Extension 82 of door 22 has channels 90 on distal end 92 to receive legs 94 of hinge 80. As shown in FIG. 10, when legs 94 of hinge 80 are received in channels 90 of extension 82, the channels hold the two pieces of material 84, 86 together to help secure the two pieces of material about the vertical pivot rod. Screws 96, optionally with a special drive pattern such as a five or six lobe star pattern, multi-lobe pattern with a tamper dot formed in the middle, or an 8 or 10 point star pattern may be used to prevent a person with a normal screw driver or a Phillips head screwdriver from tampering with the door 22.

The door 22 has window 96 formed along its length to allow the interior of the individual compartment to be inspected from outside the charging locker. Optionally the light mentioned above may be turned on from outside the charging locker to make the interior of the individual compartments visible through the windows 96 on doors 22.

The proximal end 98 of door 22 includes latch plate 99 including latch hole 102. Latch plate 99 is placed adjacent keypad locking system 24 when door 22 is closed such that latch hole 102 is engageable by plunger 48 when the lock is activated. Engagement between plunger 48 and latch hole 102 prevents the door from opening when the individual compartment is locked.

FIGS. 12-14 are perspective views showing a process of inserting or removing a modular power supply unit 100 from the charging locker of FIGS. 1-2, for example in connection with servicing or replacement of the power supply unit. In one implementation a single power supply unit 100 is provided for a charging locker 10 having multiple individual charging compartments 18. Hence, the single power supply unit 100 is used to provide power to multiple individual charging compartments.

The modular power supply unit 100 is implemented, in an embodiment, to include a power supply components case 102 and a face plate 104. The face plate 104 is secured to the power supply components case 102 and serves to prevent access to the power supply components case 102 from the interior of the charging locker. In an implementation, face plate 104 is secured to a raceway 106 via connectors 108. Connectors 108 may be, for example, screws or other removable mechanical fasteners. Connectors 108 optionally may be provided with a special drive pattern such as a five or six lobe star pattern, multi-lobe pattern with a tamper dot formed in the middle, or an 8 or 10 point star pattern to prevent a person with a normal screw driver or a Phillips head screwdriver from tampering with the modular power supply unit 100.

Raceway 106 contains wires (not shown) distributing power from the modular power supply unit 100 to each of the individual charging compartments.

As shown in FIGS. 12-14, when the modular power supply unit 100 is to be serviced, i.e. replaced, the interior of one of the individual charging compartments 18 that contains the modular power supply unit 100 is accessed and the connectors 108 are removed to disconnect faceplate 104 from raceway 106. The modular power supply unit is then slid through a gap 110 in frame member 112 (FIG. 13). The modular power supply unit 100 can then be removed from the interior of the charging locker 10 (FIG. 14). Wires (not shown) extending from the modular power supply unit to the modular locking and charging systems 20 discussed in greater detail above are disconnected in connection with removal of the modular power supply unit from the charging locker. To install a modular power supply unit 100 the process shown in FIGS. 12-14 is reversed.

Although an implementation has been shown in the figures in which five similar charging lockers are shown together forming a single storage system, in other implementations fewer or greater numbers of similar charging lockers may be included in a storage system. For example, a storage system may include a single charging locker, between two and 5 charging lockers, 10, 15, or a larger number of similarly configured charging lockers. Thus, although an implementation has been shown in which there are five similarly configured charging lockers, the invention is not limited to this particular implementation.

The following reference numerals are used in the drawings:

10 charging locker
cabinet body
12 top panel
13 back panel
14 side panels
15 bottom panel
16 interior shelves
17 slits in back panel
18 individual charging compartments
20 modular locking and charging system
22 door
24 keypad locking system 24
26 charging system
28 frame
30 bottom
32 rear fold
34 connector
36 aperture in face of charging system
38 front plate of frame
40 side plate of frame
41 aperture in side plate of frame
42 screws used to hold in keypad
44 notch in front plate of frame
46 power cord
48 plunger
50 keys
52 Locked LED
54 unlocked LED
56 slit in front plate of frame
58 projection on door
60 circuit 62 face plate
64 AC aperture
66 simplex
68 DC apertures
70 DC receptacles
72 circuit board
74 lip of face plate
76 vertical wall
78 lip of keypad
80 hinge
82 door extension
84 front piece of material of hinge
86 back piece of material of hinge
87 aperture
88 region
90 channels
92 distal end
94 legs of hinge
96 window
98 proximal end of door
99 latch plate
100 power supply unit
102 power supply components case
104 face plate
106 raceway
110 gap
112 frame member A number of implementations have been described. Nevertheless, it will be understood that additional modifications may be made without departing from the scope of the inventive concepts described herein, and, accordingly, other implementations are within the scope of the following claims.

What is claimed is:

1. A charging locker, comprising:
   a cabinet body having a plurality of interior shelves defining a plurality of individual charging compartments, each individual charging compartment having an interior defined by a left wall, back wall, right wall, top, and bottom, and an open front providing access to the interior of the individual charging compartment;
   a plurality of doors corresponding to the plurality of individual charging compartments, each door being disposed at an open front of a respective individual charging compartment such that the door encloses the interior of the respective individual charging compartment when closed, and enables access to the interior of the respective individual charging compartment when opened;
   a plurality of electronic locks corresponding to the plurality of individual charging compartments, each electronic lock being disposed at the open front of the respective individual charging compartment to secure the door of the respective individual charging compartment; and
   a plurality of charging systems corresponding to the plurality of individual charging compartments, each charging system being disposed at a respective individual charging compartment;
   wherein each of the plurality of electronic locks, each of the plurality of charging systems, and each of the plurality of doors, are individually removable from the respective individual charging compartment without disassembly of the cabinet body and without requiring access to any of the other individual charging compartments.

2. The charging locker of claim 1, wherein the door comprises a hinge, a door extension removably coupled to the hinge, a latch plate at the end of the door extension, and a window formed within the door extension.

3. The charging locker of claim 1, further comprising a single modular power system to provide power to each of the individual charging compartments of the charging locker.

4. The charging locker of claim 1, wherein the charging system includes a National Electrical Manufacturers Association (NEMA) electrical outlet or an International Electrotechnical Commission (IEC) coupler, and two USB outlets.

5. The charging locker of claim 4, wherein the NEMA electrical outlet or IEC coupler provides 110-120V AC power or 220-240V AC power, and wherein the two USB outlets each provide DC power according to one of the USB standards.

6. The charging locker of claim 1, each individual charging compartment including further comprising a door sensor configured to detect when the door of that individual charging compartment is closed.

7. The charging locker of claim 6, wherein the door sensor is an optical sensor.

8. The charging locker of claim 7, wherein the frame comprises a slit, wherein the door comprises a projection to fit through the slit when the door is closed, and wherein the projection interferes with light associated with the optical sensor when the door is closed.

9. The charging locker of claim 1, each individual charging compartment including a frame having a front plate and a side plate, the electronic lock being disposed on the front plate and the charging system being disposed on the side plate.

10. The charging locker of claim 9, wherein the frame further comprises a bottom plate extending from the side plate of the frame and a rear fold formed on an edge of the bottom plate distal from the side plate of the frame.

11. The charging locker of claim 10, further comprising a first aperture in the rear fold to receive a first connector to removably secure the frame to an interior of one of the individual charging compartments.

12. The charging locker of claim 11, wherein the first connector is accessible by insertion of a tool through a second aperture in the side plate of the frame.

13. The charging locker of claim 12, wherein the charging system is supported by the side plate of the frame and is selectively secured to the interior of one of the individual charging compartments by a second connector to be removable from the interior of the individual charging compartment without removing the frame.

14. The charging locker of claim 13, wherein the charging system has a lip to extend through an aperture in the side plate of the frame to engage a rear surface of the side plate of the frame to hold the charging system against the front surface of the side plate of the frame.

15. A storage system, comprising:
   a plurality of individual charging compartment modules, each individual charging compartment module having an exterior body envelope defining a secure interior space of the individual charging compartment module and a door to individually enclose the secure interior space; and
   a plurality of modular locking and charging systems corresponding on a one to one basis with the plurality of individual charging compartment modules and configured to individually secure the doors of the plurality of individual charging compartment modules and provide access to a source of power within the individual charging compartment modules;

wherein each of the modular locking and charging systems, and each of the doors of the individual charging compartment modules are individually removable from a front of the storage system without disassembly of the storage system and without requiring access to any of the other individual charging compartment modules.

* * * * *